United States Patent
Blonde et al.

(10) Patent No.: US 7,593,541 B2
(45) Date of Patent: Sep. 22, 2009

(54) APPARATUS AND METHOD FOR DISPLAYING IMAGES

(75) Inventors: Laurent Blonde, Thorigné-Fouillard (FR); Didier Doyen, La Bouexière (FR); Thierry Borel, Noyal sur Vilaine (FR); Jonathan Kervec, Paimpont (FR)

(73) Assignee: Thomson Licensing, Boulogne Billancourt (FR)

( * ) Notice: Subject to any disclaimer, the term of this patent is extended or adjusted under 35 U.S.C. 154(b) by 350 days.

(21) Appl. No.: 11/132,737

(22) Filed: Apr. 26, 2005

(65) Prior Publication Data

US 2006/0034482 A1   Feb. 16, 2006

(30) Foreign Application Priority Data

Apr. 28, 2004   (FR)   ................... 04 04510

(51) Int. Cl.
  *G06K 9/00*   (2006.01)
  *G06F 21/00*   (2006.01)
  *H04N 7/167*   (2006.01)
(52) U.S. Cl. .................. 382/100; 382/107; 380/201; 705/57
(58) Field of Classification Search ................. 382/100, 382/107; 380/201; 705/57; 706/26
See application file for complete search history.

(56) References Cited

U.S. PATENT DOCUMENTS

| 2001/0021268 | A1* | 9/2001 | Jun et al. .................... 382/165 |
| 2002/0168069 | A1* | 11/2002 | Tehranchi et al. ........... 380/235 |
| 2003/0007679 | A1* | 1/2003 | Ohki .......................... 382/154 |
| 2004/0022411 | A1* | 2/2004 | Tamaru et al. .............. 382/100 |
| 2004/0190622 | A1* | 9/2004 | Schutten et al. ........ 375/240.16 |

FOREIGN PATENT DOCUMENTS

| EP | 1 237 369 A2 | 9/2002 |
| EP | 1 301 034 A2 | 4/2003 |
| WO | WO 01/33846 A2 | 5/2001 |

OTHER PUBLICATIONS

Search Report dated Nov. 9, 2004.

* cited by examiner

*Primary Examiner*—Bhavesh M Mehta
*Assistant Examiner*—John B Strege
(74) *Attorney, Agent, or Firm*—Robert D. Shedd; Robert B. Levy; Jorge Tony Villabon

(57) ABSTRACT

The present invention relates to an apparatus and a device for displaying images. It is known to inlay a pattern of watermark type into the sequence of images to be displayed so as to combat the copying of images by picture-taking. This inlaying consists in modulating the intensity of the pixels of the pattern about the value to be displayed at a high frequency which renders the pattern invisible to the human eye but which generates artefacts on the sequence filmed by the camcorder. This technique poses problems when the sequence of images to be displayed comprises scenes in motion. The pattern appears since the integration carried out by the eye at the moment of display of the images is not correct. According to the invention, it is proposed that the patterns to be inlayed be motion compensated.

10 Claims, 5 Drawing Sheets

APPARATUS AND METHOD FOR DISPLAYING IMAGES

This application claims the benefit, under 35 U.S.C. § 119 of French Patent Application 0404510, filed Apr. 28, 2004.

FIELD OF THE INVENTION

The present invention relates to an apparatus and a device for displaying images.

BACKGROUND OF THE INVENTION

Visual contents, be they still or moving images, are in general creations which benefit from copyright-related exclusivity guarantees. Their reproduction is in general permitted only within a strictly defined framework which allows for remuneration of authors and their beneficiaries.

In order to ensure that these legal rules are correctly adhered to, numerous systems have been developed to prevent illegal copies or sufficiently impair their quality as to render them unusable.

Within this framework, patent application EP 1 237 369 aims to combat the copying of images by picture-taking during their display, for example with a camcorder in a cinema auditorium. With this aim, it is proposed that the intensity of the pixels of a pattern be modulated about the value to be displayed at a high frequency which renders the pattern invisible to the human eye but which generates artefacts on the sequence filmed by the camcorder. This pattern is commonly called a watermark or anti-copy pattern.

The shape of the pattern is determined so as to inscribe for example messages of the type "ILLEGAL COPY" which will appear in the images displayed by the camcorder.

In order for the pattern to be invisible to the naked eye, the modulation consists in alternating images in which the pattern is bright with images in which it is dark, the mean intensity of the pattern over several images corresponding to that to be displayed in the images in the absence of a pattern. During the display of these images, the eye carries out an integration and in fact perceives the mean intensity.

This technique poses a problem however when the images represent a scene in motion. Specifically, as the eye tends to follow the motion within the image, the temporal integration is no longer done correctly and the pattern then appears to the naked eye. Let us take the example of a modulation creating a deficit of luminance for a pixel P of the pattern in a first image and a complementary surplus of luminance for the same pixel in a second image. If the eye does not shift, it sums the luminances of these two pixels and then perceives the mean luminance value. The perception of the eye is then correct. If the eye shifts, the pixel P in the first image is not integrated by the same retinal zone of the eye as this same pixel in the second image. The visual sum between these two pixels is no longer correct and the pattern appears.

SUMMARY OF THE INVENTION

In order to avoid this problem the invention proposes that the pattern be shifted in accordance with the motion of the eye.

Thus, the invention relates to a method of image processing intended to display at least one anti-copy pattern in a sequence of video images, each video image comprising a plurality of pixels arranged in rows and columns and said pattern comprising a set of pixels selected from said image, each pixel being displayed with a predetermined intensity in each of the images, said pattern being intended to temporally modulate the intensity of the pixels selected about their predetermined intensity so as to be invisible to the human eye when the images of the sequence are still and to generate artefacts when said images are copied by picture-taking during their display, wherein the motion between the images of at least one group of n consecutive images of the sequence is estimated, n being greater than or equal to 2, and wherein the pattern is motion compensated for said group according to the estimated motion for this group.

The eye will thus integrate the same pixels of the pattern and no longer perceive the pattern for this group of images.

According to a first embodiment, the motion is estimated for all the images of the sequence and the pattern is motion compensated in such a way as to follow the estimated motion. The pattern then moves according to the estimated motion. When the pattern reaches an edge of the image, it is repositioned at its initial position or on the opposite edge of the image.

To prevent the pattern reaching an image edge when it is motion compensated, according to a second embodiment, the motion between the images of the sequence is estimated in groups of n consecutive images and the pattern is motion compensated in each of said groups according to the estimated motion for this group. The position of the pattern for the first image of each of the groups of n images is then the same. If the integer n is not very high, for example is between 2 and 5, and if the pattern is positioned at the center of the image for the first image of the group, there is a low probability of it reaching an edge of the image when it is motion compensated and there is therefore no need to reposition it in this case.

Advantageously, the changes of shot are detected in the sequence of images in such a manner that when a change of shot is detected, the shape and/or the position of the pattern is renewed. The pattern is for example repositioned on one of the edges of the images.

Another detection step can also be provided for detecting the presence of new image zones in the sequence. A new pattern in said image zone is then advantageously generated in each new image zone detected.

The invention also relates to a device for processing a sequence of video images, each video image comprising a plurality of pixels arranged in rows and columns, each pixel being displayed with a predetermined intensity in each of the images. The device comprises:

- a generator of patterns able to generate control signals pertaining to at least one pattern of pixels in each of the video images, said control signals being intended to temporally modulate the intensity of the pixels of the pattern about their predetermined intensity in such a way as to render said pattern invisible to the human eye when said images are still, while generating artefacts when said images are copied by picture-taking during their display,
- means for receiving said control signals and modifying the intensity of the pixels of each of the video images in the sequence in accordance with said control signals, and is characterized in that it furthermore comprises a motion estimator for estimating the motion between the images of at least one group of n consecutive images of the sequence, n being greater than or equal to 2, and second means for modifying the control signals for the patterns of said group according to the estimated motion in such a way as to motion compensate them.

For the implementation of the first embodiment of the invention, the motion estimator estimates the motion of the set of images of the sequence and the second means modify the control signals for the patterns such that the latter follow the estimated motion.

For the implementation of the second embodiment of the invention, the motion estimator estimates the motion of the images of the sequence in groups of n consecutive images and the second means modify the control signals for the patterns in such a way as to motion compensate said patterns for each group of images according to the estimated motion for this group.

Advantageously, the device is supplemented with first means of detection for detecting the changes of shot in said sequence of images, said first means of detection then being coupled to said generator of patterns so that, when a change of shot is detected, said generator of patterns renews the shape and/or position of the pattern.

The device of the invention is also advantageously supplemented with second means of detection for detecting the presence of new image zones in the sequence, said second means of detection being coupled to said generator of patterns so as to generate, when a new image zone is detected, a new pattern in said image zone.

BRIEF DESCRIPTION OF THE DRAWINGS

The invention will be better understood on reading the description which follows, given by way of non-limiting example, with reference to the appended drawings among which.

DESCRIPTION OF PREFERRED EMBODIMENTS

According to the invention, the pattern is motion compensated in the images displayed for at least part of them and follows the estimated motion. The pattern is any set of pixels. It can define a message that is made to appear by modulation when it is filmed by a camcorder.

According to a first embodiment, the motion is estimated for the set of images and, for each image, the pattern is motion compensated with respect to the image which precedes it in the sequence or with respect to another previous image.

Figure 1:
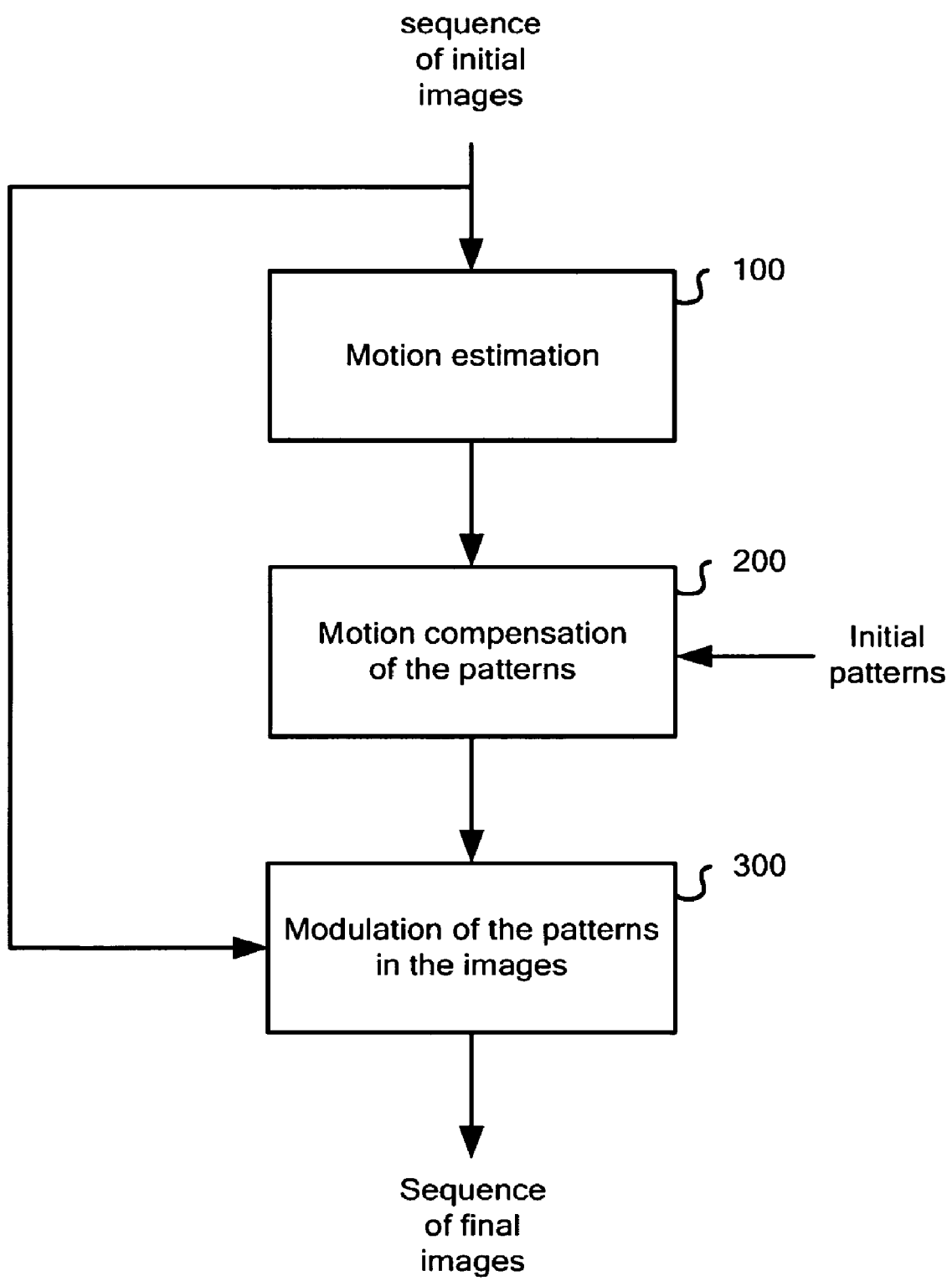
FIG. 1 is a flowchart illustrating a first embodiment of the method of the invention.

FIG. 1 shows the steps of this embodiment. A first step, referenced 100, consists in carrying out an estimation of motion for each image of the sequence with respect to a previous image. The motion is estimated by conventional procedures well known to the person skilled in the art. In a second step, referenced 200, the motion estimated for each image is applied to each of the pixels of the pattern, the position and the shape of the pattern being predefined for the first image. This pattern is thereafter modulated in said first image in the course of a step referenced 300. In the case of the first image of the sequence, the estimated motion is zero and the pattern is modulated as it stands in the first image. For the second image, the motion estimated for this image in the course of step 100 is nonzero if the sequence represents a scene in motion. The pattern is then motion compensated in step 200 and the second image is thereafter modulated by the motion-compensated pattern during step 300. This process is repeated from image to image until the pattern exits the image. The pattern is then preferably repositioned on one of the edges of the image or reset to its initial position.

Figure 2:
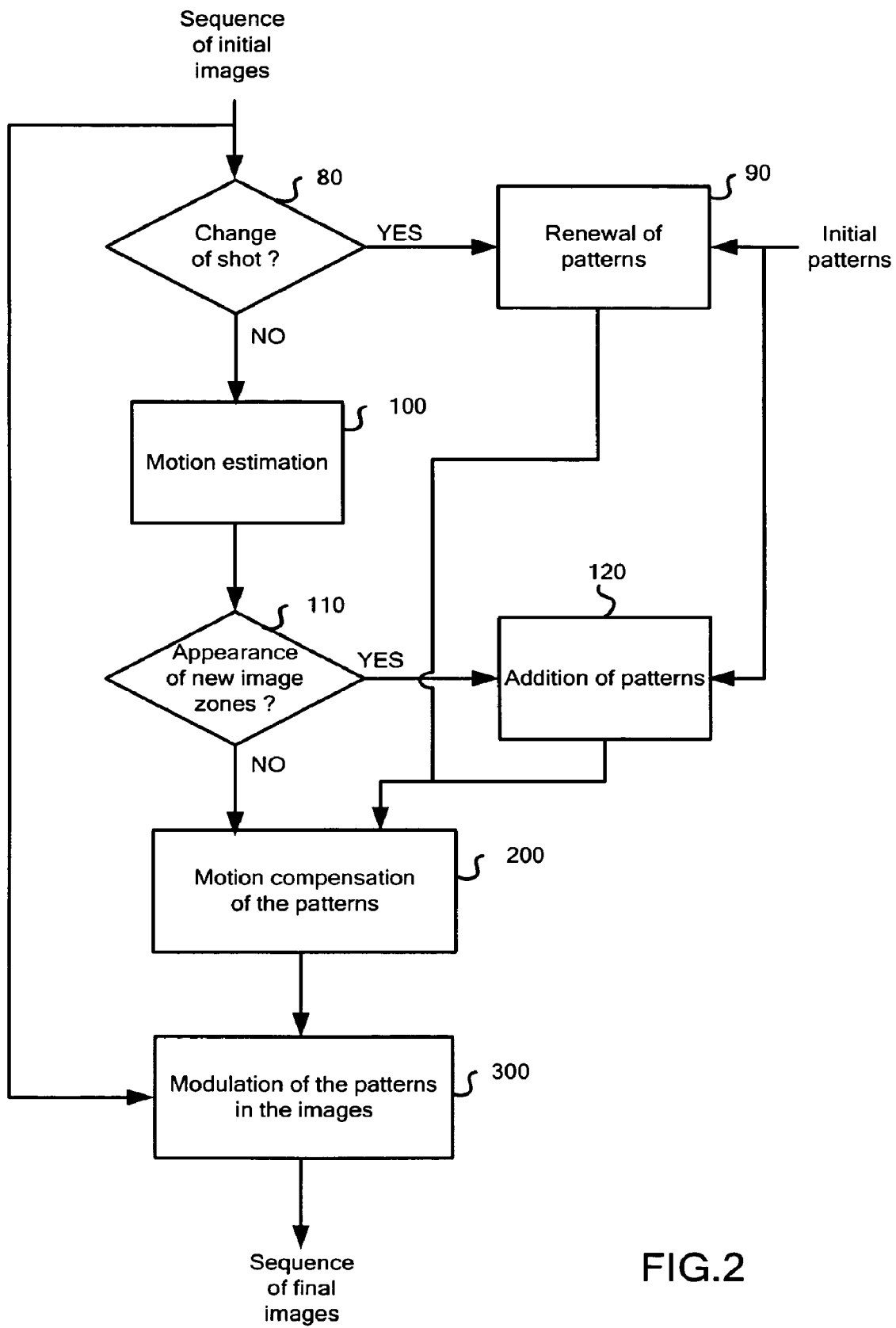
FIG. 2 is a flowchart illustrating a variant of the first embodiment of the method of the invention.

Advantageously, the shape and/or the position of the pattern is renewed when a change of shot in the scene filmed is detected. This improvement is illustrated by FIG. 2. Before performing the motion estimation 100, a shot change detection step 80 is performed. If a change of shot is detected, the shape and/or the position of the pattern is modified during a step referenced 90. This detection step can be implemented by the motion estimator.

A step aimed at detecting the appearance of new zones in the images to be displayed may also be used to detect the addition of new patterns into these zones. These steps of detecting and adding patterns are referenced 110 and 120 respectively in the variant embodiment of FIG. 2.

According to a second embodiment, the motion between the images is estimated in groups of images and the pattern is motion compensated in each of the groups of images according to the motion estimated for this group. The pattern is thus replaced at its initial position at the start of each of the groups of images.

Figure 3:
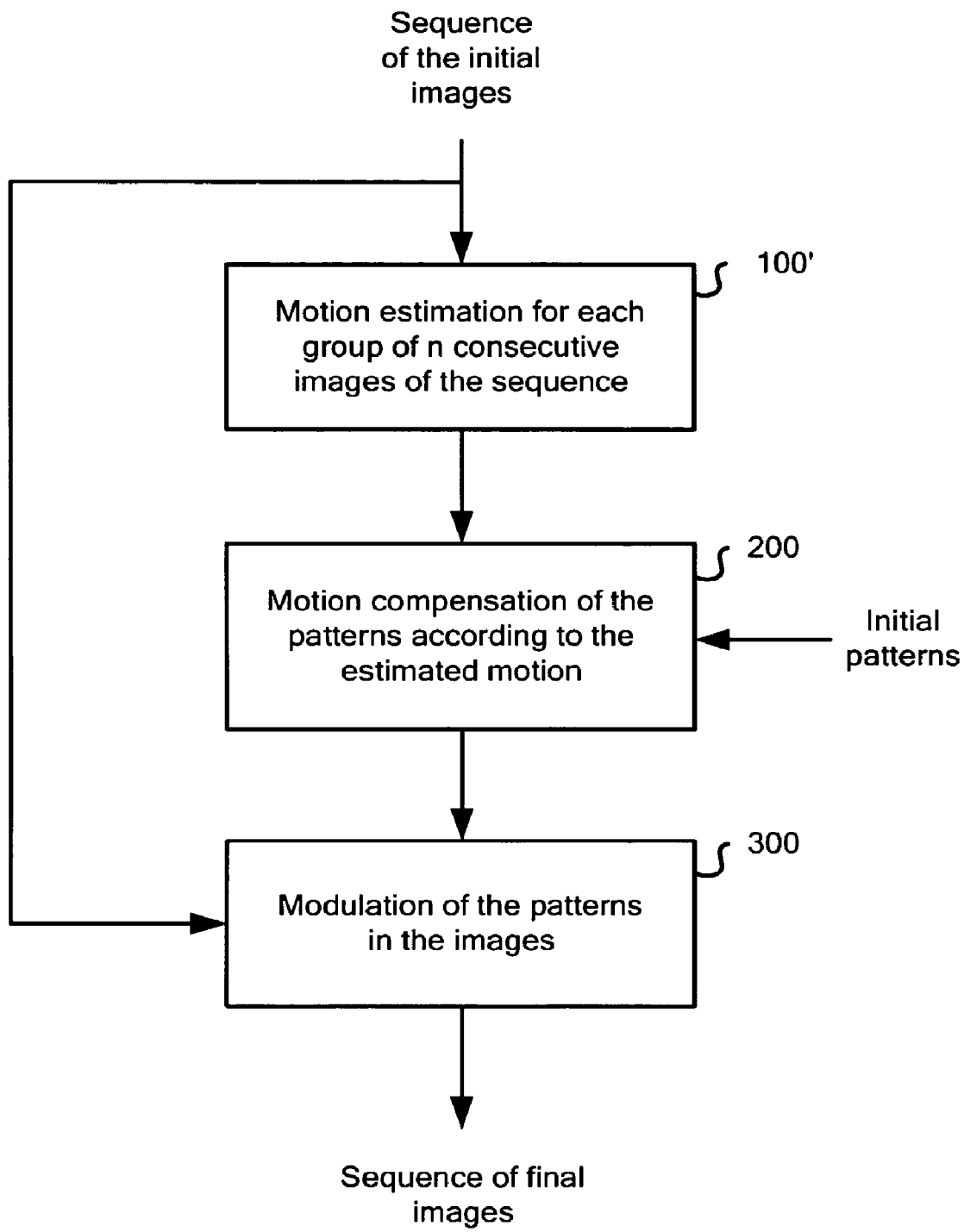
FIG. 3 is a flowchart illustrating a second embodiment of the method of the invention.

This mode of embodiment is illustrated by FIG. 3. This figure differs from FIG. 2 in that the first step, referenced 100' henceforth, consists in carrying out a motion estimation for each group of n consecutive images of the sequence. In each of these groups, the motion of an image is estimated with respect to the previous one. Thereafter, as in FIG. 2, the motion estimated for each image is applied to each of the pixels of the pattern in the course of step 200 and the pattern is modulated in the images of the sequence in the course of step 300.

Figure 4:
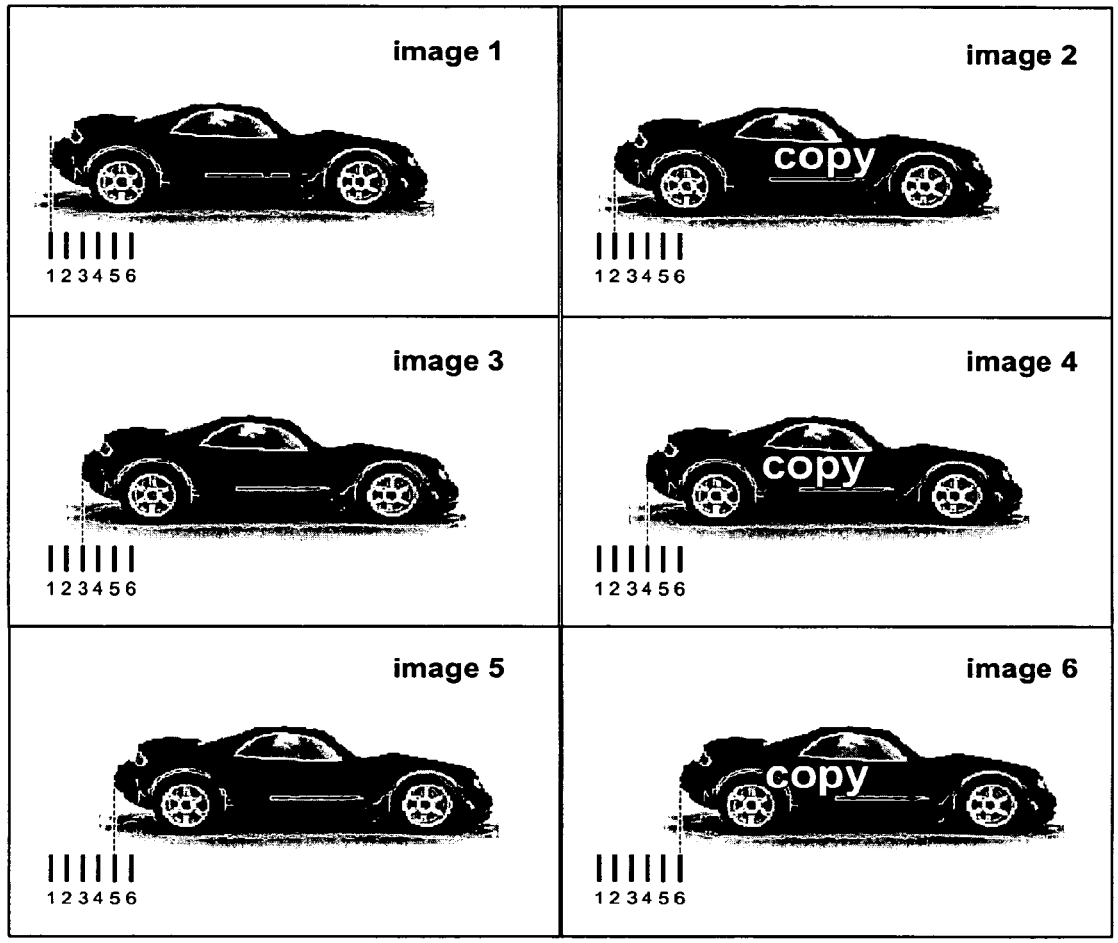
FIG. 4 represents a sequence of images to which the second embodiment of the invention is applied.

This second embodiment is illustrated by FIG. 4 representing a sequence of 6 images showing a grey car moving at constant speed in a given direction (towards the right). A ground marking indicates the position of the car in each image. In the first image, the car is in position 1. In the second image, it is in position 2 and so on and so forth. The motion is estimated in each group of 2 images. The modulated pattern in the sequence of images is the word 'copy'. It is inlayed over the grey door of the car and therefore alternates between the colour black and the colour white so that the eye perceives a grey colour corresponding to the grey colour of the car. This pattern is motion compensated in each group of 2 images. In images no. 1, no. 3 and no. 5, this word is situated at the same location in the image, namely at the center of the image. In images no. 2, no. 4 and no. 6, it is offset by a quantity corresponding to the displacement value estimated for each of the groups. In the present case, as the speed of the car is constant, the word 'copy' is offset by the same quantity in each of these images.

This embodiment may of course be applied to groups of 3 or more consecutive images. It has the advantage of not having to reposition the pattern when it reaches an edge of the image.

The detection of a change of shot for the renewal of the pattern and the detection of new images for the addition of new patterns may possibly be implemented in this embodiment.

Figure 5:
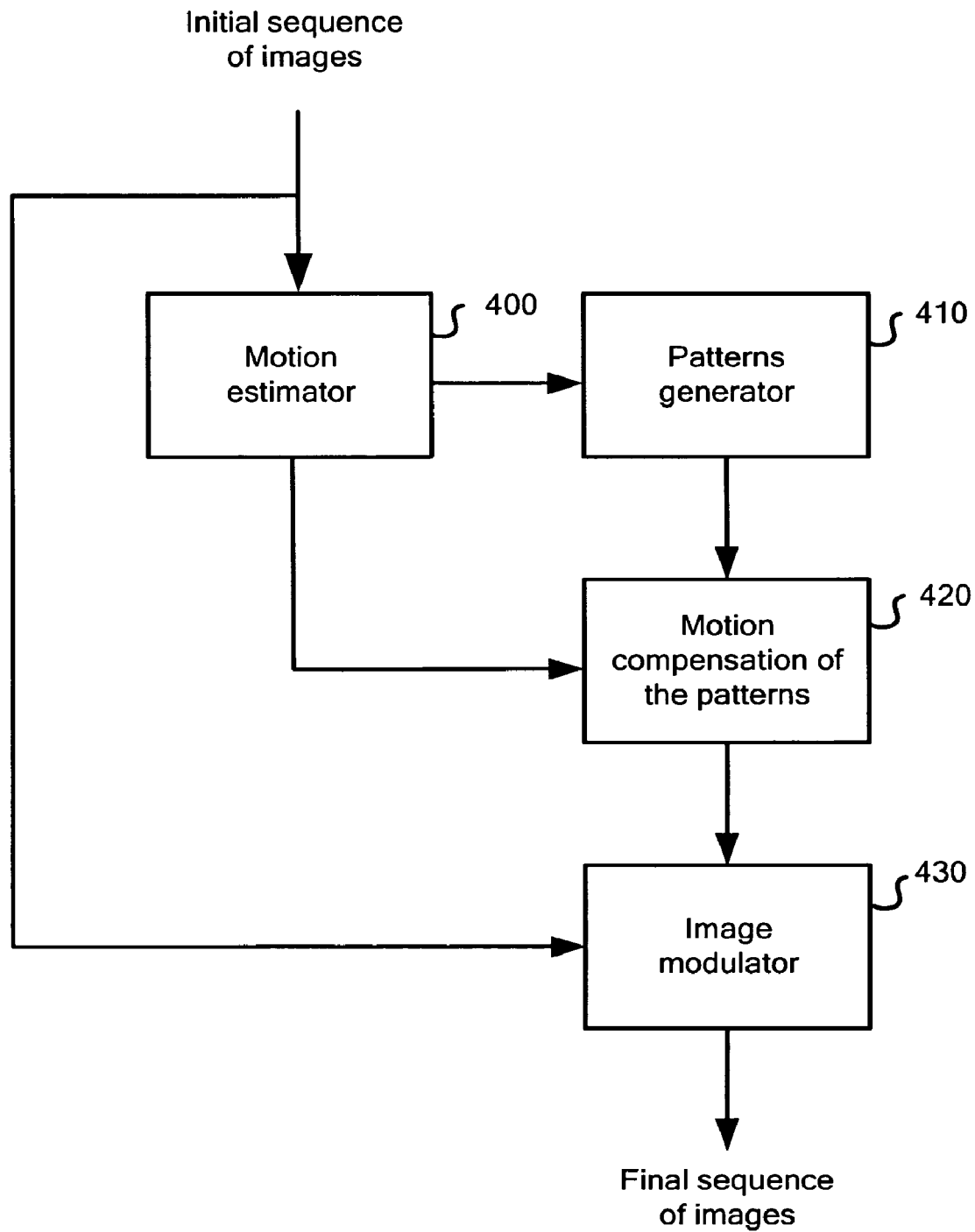
FIG. 5 shows a diagram of a device implementing the method of the invention.

A device able to implement the method of the invention is represented in FIG. 5.

The sequence of initial images is supplied to a motion estimator 400 which calculates, for each of these images of a group of images or the set of images, a set of motion vectors characterizing the motion of the image with respect to a previous image in the sequence. These motion vectors are supplied to a patterns motion compensation device 420. The latter also receives patterns in the form of control signals originating from a patterns generator 410. These control signals are intended to temporally modulate the intensity of the image pixels about a mean value so as to form at least one pattern in the images of the sequence. The device 420 modifies the control signals in accordance with the motion vectors calculated by the estimator 400 and transmits them to an image modulator 430. The sequence of initial images is also transmitted to the modulator 430. The latter is then responsible for performing the modulation of the images of the sequence in accordance with the motion-compensated command signals and delivers a sequence of final images in which the patterns are motion compensated.

Advantageously, the motion estimator 400 is used to detect the changes of shot in the sequence of images. As soon as a change of shot is detected, the latter then sends a command signal to the patterns generator 410 to renew the shape and/or the position of the pattern or patterns to be inlayed. It may also be used to detect the presence of new zones in the images of the sequence and to add patterns into these new zones.

The invention claimed is:

1. Method of image processing intended to display at least one anti-copy pattern in a sequence of video images, each video image comprising a plurality of pixels arranged in rows and columns, each pixel of said image having a predetermined intensity, wherein a set of pixels is selected from said image to insert said anti-copy pattern, the method comprising the steps of:

displaying each pixel of the selected pixels with the predetermined intensity and inserting said anti-copy pattern by temporally modulating the predetermined intensity of the selected pixels about their predetermined intensity such that said anti-copy pattern is invisible to the human eye when the video images of the sequence are still and such that artifacts are generated when the video images of the sequence are copied by picture-taking during their display, estimating motion of at least the selected pixels between the images of at least one group of n consecutive images of the sequence, n being greater than or equal to 2, and motion compensating the selection of pixels within the images of said at least one group according to the estimated motion by changing from image to image of said at least one group, the selection of the pixels used to insert said anti-copy pattern in such a way that said anti-copy pattern moves according to the estimated motion of said selected pixels.

2. Method according to claim 1, wherein the motion between the images of the sequence is estimated in groups of n consecutive images and wherein the selection of pixels is motion compensated in each of said groups according to the estimated motion for the group.

3. Method according to claim 2, wherein n is between 2 and 5.

4. Method according to claim 1, comprising detecting changes of shot in said sequence of images and renewing at least one of a shape and position of the anti-copy pattern when a change of shot is detected.

5. Method according to claim 1, comprising detecting the presence of new image zones in the sequence and selecting a new set of pixels in which to insert a new anti-copy pattern when a new image zone is detected.

6. Device for processing a sequence of video images, each video image comprising a plurality of pixels arranged in rows and columns, each pixel of said image having a predetermined intensity, said device comprising:

a generator of patterns able to generate control signals pertaining to at least one pattern of pixels in each of the video images, said control signals being intended to temporally modulate the predetermined intensity of at least a set of selected pixels of the of said video image about the predetermined intensity in such a way as to insert said anti-copy pattern into said video image to render said pattern invisible to the human eye when said images are still, while generating display artifacts when said images are copied by picture-taking, first means for receiving said control signals and modifying the intensity of the pixels of each of the video images in the sequence in accordance with said control signals, a motion estimator for estimating motion of at least said selected pixels between the images of at least one group of n consecutive images of the sequence, n being greater than or equal to 2, and second means for modifying the control signals for anti-copy patterns of said group according to the estimated motion to motion compensate the selection of pixels within the images of said at least one group according to the estimated motion by changing from image to image of said at least one group the selection of pixels used to insert said anti-copy pattern in such a way that said pattern moves according to the estimated motion of said selected pixels.

7. Device according to claim 6, wherein the motion estimator estimates the motion of the images of the sequence in groups of n consecutive images and wherein the second means modifies the control signals for the patterns to motion compensate the selection of pixels for each group of images according to the estimated motion for the group.

8. Device according to claim 6, comprising a first means of detection for detecting changes of shot in said sequence of images, the second means being coupled to said generator of patterns so that, when a change of shot is detected, said generator of patterns renews at least one of a shape and position of the patterns.

9. Device according to claim 6, comprising a second means of detection for detecting the presence of new image zones in the sequence, said second means of detection being coupled to said generator of patterns so as to insert, when a new image zone is detected, a new pattern in said image zone.

10. Method according to claim 1, wherein a change of shot is detected in said sequence of images and wherein at least one of a shape and position of the pattern is renewed when the change of shot is detected.

* * * * *

UNITED STATES PATENT AND TRADEMARK OFFICE
CERTIFICATE OF CORRECTION

PATENT NO. : 7,593,541 B2
APPLICATION NO. : 11/132737
DATED : September 22, 2009
INVENTOR(S) : Blonde et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 540 days.

Signed and Sealed this

Twenty-first Day of September, 2010

David J. Kappos
*Director of the United States Patent and Trademark Office*